Dec. 4, 1951 R. P. CLIFTON 2,577,404
ROTARY HYDRAULIC COUPLING
Filed April 16, 1945 2 SHEETS—SHEET 2
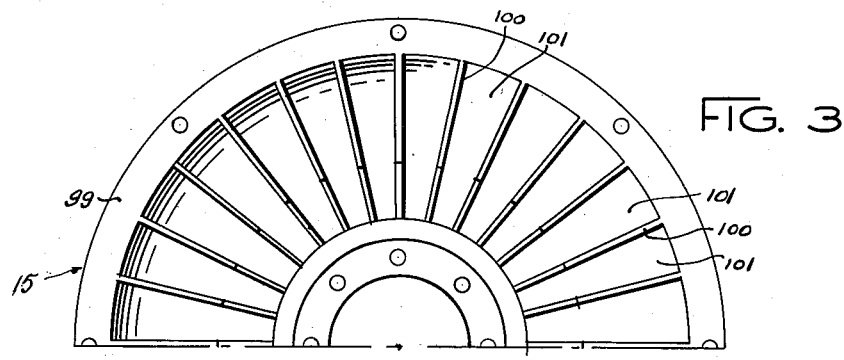
FIG. 3
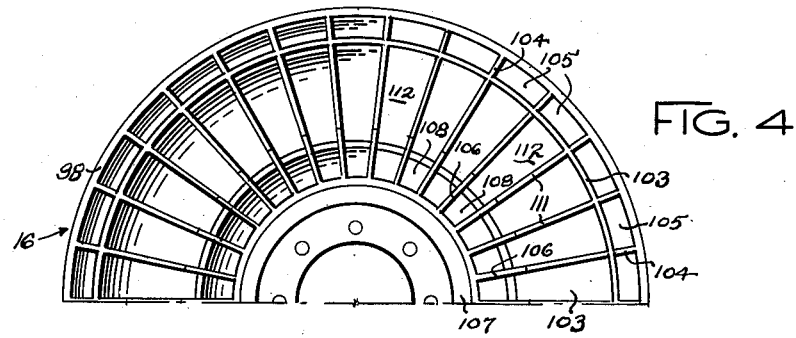
FIG. 4
FIG. 5
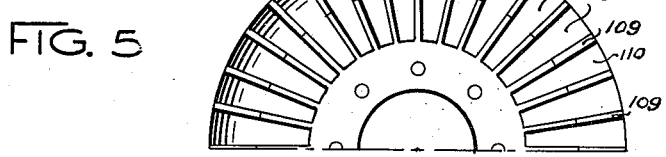
FIG. 6
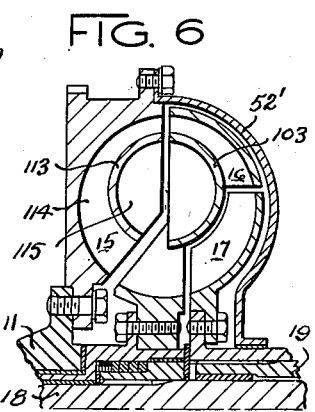
FIG. 7
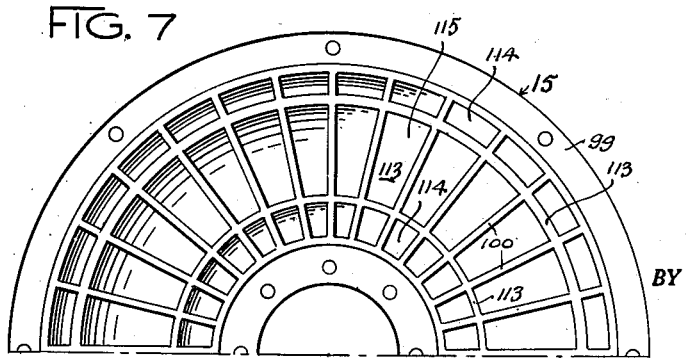
INVENTOR.
Robert P. Clifton
BY
Sibbetts + Hart
ATTORNEYS Patented Dec. 4, 1951

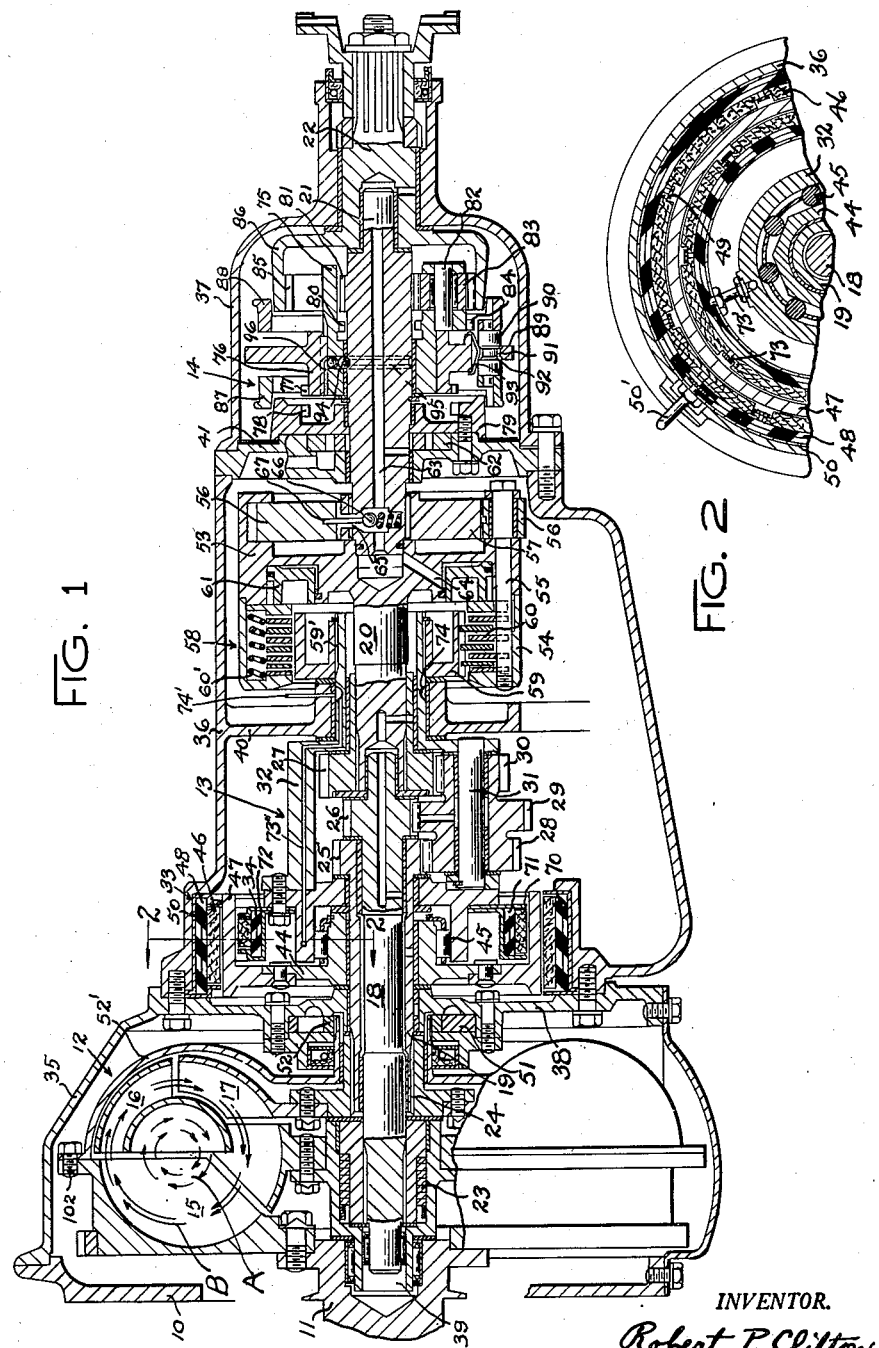

2,577,404

UNITED STATES PATENT OFFICE 2,577,404

ROTARY HYDRAULIC COUPLING

Robert P. Clifton, Dearborn, Mich., assignor to Packard Motor Car Company, Detroit, Mich., a corporation of Michigan Application April 16, 1945, Serial No. 588,617

4 Claims. (Cl. 60—54)

This invention relates to transmission mechanism and more particularly to the type incorporating a fluid coupling.

An object of the invention is to increase the effective driving range of the low speed runner in a fluid coupling having a plurality of runners for driving transmission mechanism at different speeds.

Another object of the invention is to increase the effective capacity of one runner of a plural runner Föttinger type fluid coupling by uitilizing the interior of the core and the impeller to form a second fluid operating circuit.

A further object of the invention is to conserve the space required in change speed planetary gearing through the nesting of two conditioning devices and locating them around the carrier.

Other objects of the invention will appear from the following description taken in connection with the drawings, which form a part of this specification, and in which:

Fig. 1 is a longitudinal sectional view of transmission mechanism incorporating the invention;

Fig. 2 is a sectional view through control mechanism taken on line 2—2 of Fig. 1;

Fig. 3 is an elevational view of the fluid coupling impeller looking toward the inside;

Fig. 4 is an elevational view of the first runner of the fluid coupling looking toward the right as viewed in Fig. 1;

Fig. 5 is an elevational view of the second runner of the fluid coupling looking toward the right as viewed in Fig. 1;

Fig. 6 is a partial sectional view of a modified form of fluid coupling;

Fig. 7 is an elevational view of the impeller of the modified coupling looking toward the left as viewed in Fig. 6.

Referring to the drawings by characters of reference, the power transmission mechanism comprises generally a power unit, such as an engine of which the rear casing wall 10 and crankshaft 11 are illustrated, a fluid coupling 12, planetary gearing 13 and forward and reverse drive selector mechanism 14.

The crankshaft is fixed to the fluid coupling impeller or driving rotor 15 and the fluid coupling has two runners or driven rotors 16 and 17 associated respectively with shafts 18 and 19 for actuating driven shaft 20. Rotor 16 may be termed a primary driven rotor and rotor 17 may be termed a secondary driven rotor, both rotors with the driving rotor defining a toroidal container through which the energized fluid in the coupling flows. Shaft 20 is connected to drive tail shaft 21 from which rotation is imparted to propeller shaft 22 through the forward and reverse selector mechanism 14. Runner 16 is drivingly connected with shaft 18 by a spring type overrunning clutch 23 while runner 17 is splined at 24 to shaft 19.

The planetary gearing includes drive gear 26 fixed to rotate with shaft 18, drive gear 25 fixed to rotate with shaft 19 and driven gear 27 fixed to shaft 20. Planet gear 28 meshes with gear 25, planet gear 29 meshes with gear 26 and planet gear 30 meshes with gear 27. These planet gears may be formed separately and secured together or formed as a unit and the unitary structure is rotatably mounted on pin 31 fixed to carrier 32. The ratios of gears 26 and 29 and gears 25 and 28 are such that the drive through each pair is different. Fluid in the coupling 12 is circulated by impeller 15 through runners 16 and 17 in series. Shaft 18 will be driven by the first runner 16 through clutch 23 to provide low speed drive to shaft 20 through gears 26, 29, 30 and 27, and as the fluid pressure increases in the coupling the second runner will become effective and will take over the drive through shaft 19 and gears 25, 28, 30 and 27 to provide a higher or intermediate speed. As the planet gears are fixed to rotate as a unit, shaft 18 will be driven through the gearing from shaft 19 during intermediate drive at a higher speed than runner 16 is rotating and clutch 23 permits shaft 18 to overrun its runner. The planetary gearing will be ineffective to drive unless retrograde movement of the carrier is prevented and two brake devices 33 and 34 are provided for this purpose.

The fluid coupling 12, gearing 13 and selector mechanism 14 are housed in a casing comprised of sections 35, 36 and 37. Casing section 35 houses the fluid coupling, casing section 36 houses the planetary gearing and its controls and casing section 37 houses the selector mechanism 14. The rear wall 38 of casing section 35 serves to support the telescoped shafts 18 and 19 while the forward end of shaft 18 is mounted in an extension 39 of the first runner which pilots in the rear end of the crank shaft. The carrier is rotatably mounted on shaft 19 at one end and the other end, together with shaft 20, is carried by wall 40. Shaft 21 is piloted in the rear end of shaft 20 and the front end of shaft 22 and is mounted in wall 41 intermediate casing sections 36 and 37.

The brake device 33 comprises an abutment member 44 adapted to be fixed with the carrier 32 by an overrunning clutch 45, a sectional brake band 46 for engaging the outer wall of the abutment member rim 47 and an actuator for the brake band consisting of a rubber tube 48. The band is normally expanded by flexible metal strips 49 anchored in the adjacent ends of the band sections and the tube is housed in a carrier 50 fixed to casing section 36. The interior of the tube may be suitably connected by conduit means 50' with a source of fluid placed under pressure by a pump comprised of rotor members 51 and 52, member 52 being splined to the cover 52' attached to the coupling impeller 15. When the brake band is engaged, the overrunning clutch will wedge between the brake drum and the carrier 32 preventing retrograde movement of carrier 32 to establish first and intermediate driving speeds through the planetary gearing.

The connection between shafts 20 and 21 may be a torque speed device of the character shown in application Ser. No. 587,523 filed April 10, 1945. Shaft 20 has a flange 53 at its rear end to which a casing 54 is secured by bolts 55. Flyweights, as indicated by numeral 56, are pivotally mounted on the bolts and to arms 57 on the forward end of shaft 21 thus providing a driving connection between the shafts.

High or direct drive is obtained by locking up the planetary gearing through means of a clutch device 58 to cause the gearing and fluid coupling to rotate as a unit. A clutch ring 59 is splined at 59' to the carrier 32 and clutch plates 60 are splined alternately to such ring and to casing 54 fixed to shaft flange 53. The plates are normally disengaged by springs 60' and engaged by piston 61 when actuated by fluid pressure from a suitable source such as a pump 62 driven by shaft 21. The fluid flow to the clutch is preferably controlled by the torque speed connector between shafts 20 and 21. The pump is connected with passage 63 extending axially through shaft 21, and passage 64 in flange 53 leads from passage 63 to the piston 61. A vent passage 65 extends radially through shaft 21 from passage 63 and contains a spring seated valve 66 controlled by a stem 67 fixed to one of the flyweights 56. The engine torque transmitted to bolts 55 tends to hold the weights inwardly while centrifugal force resulting from the rotation of shaft 21 tends to move the weights outwardly. When the weights are located inwardly, stem 67 will unseat the valve so that fluid is vented through passage 65 thus bypassing the clutch actuating piston. At some point in the outward movement of the flyweights, the stem will permit the valve to close so that venting ceases and fluid will flow to the piston to engage the clutch plates thus locking up the planetary gearing. At such time the carrier 32 will overrun the abutment member 44 even though brake device 33 is engaged and thus the gearing is automatically conditioned for high speed drive. If the brake device 33 is left engaged, the planetary gearing will be conditioned for first or second speed drive whenever vent passage 65 is opened by inward movement of the flyweights.

There are operating conditions where it is desirable to positively lock the planetary gearing carrier, such for example as going downhill where braking of a vehicle by the engine is necessary. The brake device 34 serves such purpose and is located interiorly of the abutment rim 47. A sectional brake band 70 is expanded to engage the interior surface of the rim 47 by a rubber tube 71, the band and tube being housed in a casing 72 fixed to the planetary gearing carrier 32. This brake band is normally contracted by spring members 73 anchored in the ends of adjacent band sections. The tube may be inflated to engage the brake band with abutment rim 47 by fluid flowing through a pipe 73' (Fig. 2), a conduit 73'' (shown in Fig. 1) through the carrier parts, a collector groove 74, and pipe 74' connected with pump 51, 52. Obviously some suitable form of valving under control of the vehicle driver must be provided to control flow to the two brake devices so that the brake device 33 is engaged when either the one-way clutch 45 or the brake device 34 are effective.

The mechanism 14 for selecting forward or reverse drive to shaft 22 comprises a shiftable clutch sleeve 75 mounted on shaft 21 and a sleeve 76 slidably splined on sleeve 75. Sleeve 76 has teeth 77 for engaging teeth 78 on abutment plate 79 fixed to wall 41. Sleeve 75 has teeth 80 for engaging gear 81 on shaft 21 and teeth 84 for engaging gear 85 on drum 86 fixed to the propeller shaft. Sleeve 75 also carries a pin 82 on which is rotatably mounted a planet gear 83 meshing with gears 81 and 85. As shown in Fig. 1 the clutch is in neutral position and when sleeve 75 is shifted to the right teeth 80 will engage teeth 81 and teeth 84 will engage teeth 85, thus locking shaft 21 directly to shaft 22 for forward drive. When the clutch sleeve 76 is shifted to the left teeth 77 will engage teeth 78 holding sleeve 75 stationary and driving the propeller shaft reversely from shaft 21 through gears 81, 83 and 85.

Synchronizer mechanism is associated with the forward and reverse selector clutch mechanism. A pair of brake ring members 87, 88 are located one on either side of actuator flange 89 on sleeve 76 for engagement with the abutment plate 79 and drum 86. These ring members are tied together by pins 90 extending through openings 91 in the actuator flange. The pins have beveled surfaces 92 adjacent similar surfaces at the ends of openings 91 and angular springs 93 are fixed to flange 89 and extend through the openings 91 and engage the beveled surfaces of the pins. The openings are larger in diameter than the pins and springs 93 move the brake rings ahead of the clutch members when shifted from neutral to engage either brake before the clutch teeth are engaged. Due to the difference in rotational speed of shafts 21 and 22, pins 90 will be shifted along an arc so that the beveled surfaces will overlie a portion of the similar surfaces in the flange thus blocking engagement of the teeth 80 with gear 81 or teeth 84 with gear 85 until the shafts 21 and 22 reach the same speed when the shift is for forward drive, or bringing the clutch sleeves to a standstill before teeth 77 engage teeth 78 when the shift is for reverse drive. A pair of balls 94 lie in a slot in sleeve 75, the innermost ball seating in a circular groove 95 in shaft 21. One end of the sleeve 76 has a groove 96 into which the outer ball is forced when the inner ball rides out of the groove 95 as the clutch is shifted from neutral toward forward drive position to thereby lock sleeves 75 and 76 together so that sleeve 75 will be returned to neutral position from forward drive shift position with sleeve 76. The sleeve 75 will be shifted to the right from neutral position by engagement of sleeve 76 with the gear carrying portion thereof. When the clutch is shifted between neutral and reverse drive position the inner ball will drop into groove 95 thereby permitting the outer ball to be cammed inward by the right-hand end of groove 96. This will enable sleeve 76 to clear the outer ball but sleeve 75 will be held by the inner ball.

The coupling 12 is of the Föttinger type in which fluid is carried therein in the direction of rotation and also through passages in the rotors forming circuits having their axes normal to the axes of the rotors. The passages are usually formed by radial vanes extending between the rotor walls and an inner torus ring or core wall.

It is customary to provide a two rotor fluid coupling with the passages arranged so that fluid rotates in a single channel but sometimes the passages in both rotors are separated by guide rings to provide a series of concentric channels of fluid flow as in Patent 1,904,054 to Kiep et al. Then again, the driven rotors in some couplings have concentric separated passages open at their ends to common passages in the driving rotor as in Patent 2,360,258 to Murray.

When two or more driven rotors or runners are employed in fluid couplings of the character previously described to provide different driving speed through gearing, the first runner receiving inflow of fluid from the driving rotor or impeller will be the effective driver until the coupling speed creates sufficient fluid force to rotate the second runner at a speed where it will take over the drive. In many instances the second runner is effective when the engine torque is relatively low and the load can be handled more efficiently by the low speed runner. In order to improve this condition, it is proposed to utilize the space inside of the core wall to provide a second fluid circuit with the impeller and thereby increase the fluid capacity and effective driving range of the first runner.

In Figs. 1 and 3, the driving rotor or impeller 15 is formed as a flywheel having a hollow wall 99 in which a series of radial blades or vanes 100 are provided to form passages or channels 101. Cover 52' is fixed to wall 99 by bolts 102. The first driven rotor or runner 16, see Figs. 1 and 4, has a shell 98, dished wall or torous member 103 in the core portion thereof, a series of radial blades or vanes 104 between the core wall and the shell forming peripheral passages or channels 105, a hub 107 and a series of blades or vanes 106 between the hub and the core wall forming passages or channels 108. The second driven rotor or runner 17, see Figs. 1 and 5, is formed as a dished wall 97 from which a series of radial blades or vanes 109 extend forming passages or channels 110. The second runner lies between the vanes 104 and 106 so that passages 101, 105, 110 and 106 are in series in the order named to form outer operating channels or circuits for the fluid. A series of radial blades or vanes 111 extend across the space in the dished core wall forming passages or channels 112 that are open to the passages 101 in the impeller. Passages 112 and the core portions of passages 101 adjacent thereto form inner operating channels or circuits for the fluid, such inner circuits being separated from passages 105 and passages 110 by the dished core wall 103. The inner fluid circuits A and outer fluid circuits B are concentric and the inner fluid circuits are confined to the impeller and first runner, thereby increasing the energy transfer capacity of such runner to this extent. The fluid capacity of the second runner is decreased by the amount of fluid flowing through the inner circuits so the effective range of the first runner will be increased.

The fluid coupling shown in Figs. 6 and 7 is substantially the same in principle as that previously described except that the impeller is provided with a dished core wall or torus 113, thus forming inner and outer passages 114 and 115. Passages 114 will be in the outer fluid circuit and passages 115 will be in the inner fluid circuit. Thus the core wall 113 more clearly defines the inner and outer channels for the fluid flowing through the impeller.

It will be understood that various forms of the invention other than that described above may be used without departing from the spirit or scope of the invention.

What is claimed is:

1. In a hydraulic coupling of the torus type, a vaned driving rotor, a vaned primary driven rotor and a vaned secondary driven rotor, said primary driven rotor having a core wall thereon dividing the vanes into a central portion and two outer portions with respect to the torus such that two distinct fluid circuits are established, one circuit operating on the two outer portions and the other operating on the central portion; and said secondary driven rotor being disposed hydraulically between the two outer portions and solely in the hydraulic circuit operating upon the two outer portions.

2. In a hydraulic coupling of the torus type, a vaned driving rotor, a vaned primary driven rotor and a vaned secondary driven rotor, said primary driven rotor being disposed adjacent the driving rotor and receiving directly from said driving rotor all of the fluid energized by the driving rotor, and a core wall on the primary driven rotor diverting a portion of the fluid from the secondary rotor such that the secondary rotor is energized by only a fraction of the fluid energized by the driving rotor.

3. A hydraulic coupling of the torus type, including a vaned driving rotor, a vaned primary driven rotor, a vaned secondary driven rotor, a curved core wall on the primary driven rotor opening toward the driving rotor and dividing the vanes on the primary driven rotor into inner and outer regions with respect to the torus, said vanes on the outer regions being discontinuous so as to form a gap, and said vanes on the secondary driven rotor being disposed solely in said gap and separated from the fluid in the inner region by the core wall.

4. In a hydraulic coupling of the torus type, a vaned driving rotor, a vaned primary driven rotor and a vaned secondary driven rotor, said vaned primary driven rotor being disposed adjacent the driving rotor and receiving directly from the driving rotor all of the fluid energized by the driving rotor, said primary driven rotor defining the inner boundary of the gap, and said vaned secondary driven rotor being disposed in said gap and receiving only a portion of the energized fluid.

ROBERT P. CLIFTON.

REFERENCES CITED

The following references are of record in the file of this patent:

UNITED STATES PATENTS

| Number | Name | Date |
|---|---|---|
| 963,092 | Sundh | July 5, 1910 |
| 1,904,054 | Kiep | Apr. 18, 1933 |
| 2,055,895 | Fawcett | Sept. 29, 1936 |
| 2,151,151 | Perez | Mar. 21, 1939 |
| 2,185,538 | Burtnett | Jan. 2, 1940 |
| 2,237,864 | Fawick | Apr. 8, 1941 |
| 2,251,445 | Fawick | Aug. 5, 1941 |
| 2,284,123 | Breer et al. | May 26, 1942 |
| 2,304,721 | Werther | Dec. 8, 1942 |
| 2,334,021 | Miller | Nov. 9, 1943 |
| 2,346,365 | Duffield | Apr. 11, 1944 |
| 2,355,427 | Duffield | Aug. 8, 1944 |
| 2,360,259 | Murray | Oct. 10, 1944 |
| 2,373,234 | Duffield | Apr. 10, 1945 |
| 2,473,137 | Clifton | June 14, 1949 |

FOREIGN PATENTS

| Number | Country | Date |
|---|---|---|
| 548,044 | Great Britain | Sept. 23, 1942 |